(12) United States Patent
Howard et al.

(10) Patent No.: US 11,506,173 B2
(45) Date of Patent: Nov. 22, 2022

(54) SYSTEM AND METHOD FOR PROVIDING GRID-FORMING CONTROL FOR A DOUBLE-FED WIND TURBINE GENERATOR USING VIRTUAL IMPEDANCE

(71) Applicant: General Electric Company, Schenectady, NY (US)

(72) Inventors: Dustin Howard, Atlanta, GA (US); Einar Vaughn Larsen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 108 days.

(21) Appl. No.: 17/113,151

(22) Filed: Dec. 7, 2020

(65) Prior Publication Data
US 2022/0178349 A1 Jun. 9, 2022

(51) Int. Cl.
*F03D 9/00* (2016.01)
*H02P 9/04* (2006.01)
(Continued)

(52) U.S. Cl.
CPC ........... *F03D 7/0284* (2013.01); *F03D 9/257* (2017.02); *F05B 2270/1033* (2013.01);
(Continued)

(58) Field of Classification Search
CPC .. F03D 7/0284; F03D 9/257; F05B 2270/337; F05B 2270/1033; H02J 3/46; H02J 2300/28
See application file for complete search history.

(56) References Cited

U.S. PATENT DOCUMENTS 5,798,631 A * 8/1998 Spee ................... F03D 7/046
322/29
5,798,633 A 8/1998 Larsen et al.
(Continued)

FOREIGN PATENT DOCUMENTS

CN 109494709 A 3/2019
DE 102007005165 A1 8/2007
(Continued)

OTHER PUBLICATIONS

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.
(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A method for providing grid-forming control of a double-fed wind turbine generator connected to an electrical grid includes receiving at least one control signal associated with a desired total power output or a total current output of the double-fed wind turbine generator. The method also includes determining a contribution of at least one of power or current from the line-side converter to the desired total power output or to the total current output of the double-fed wind turbine generator, respectively. The method also includes determining a control command for a stator of the double-fed wind turbine generator based on the contribution of at least one of the power or the current from the line-side converter and the at least one control signal. Further, the method includes using the control command to regulate at least one of power or current in the stator of the double-fed wind-turbine generator.

16 Claims, 13 Drawing Sheets

(51) Int. Cl.
    *F03D 7/02*     (2006.01)
    *F03D 9/25*     (2016.01)
    *H02J 3/46*     (2006.01)

(52) U.S. Cl.
    CPC .......... *F05B 2270/337* (2013.01); *H02J 3/46* (2013.01); *H02J 2300/28* (2020.01)

(56) References Cited

U.S. PATENT DOCUMENTS

| | | | |
|---|---|---|---|
| 6,420,795 B1* | 7/2002 | Mikhail | H02P 9/007 290/55 |
| 7,119,452 B2 | 10/2006 | Larsen | |
| 7,456,695 B2 | 11/2008 | Weng et al. | |
| 7,804,184 B2 | 9/2010 | Yuan et al. | |
| 9,270,194 B2 | 2/2016 | Brogan et al. | |
| 9,450,415 B2* | 9/2016 | Larsen | H02P 9/007 |
| 9,660,452 B2 | 5/2017 | Routimo | |
| 9,660,453 B2 | 5/2017 | Majumder | |
| 9,787,174 B2 | 10/2017 | Letas et al. | |
| 10,156,225 B2 | 12/2018 | Huang et al. | |
| 10,985,567 B1* | 4/2021 | Vergara | H02J 7/35 |
| 11,177,660 B2* | 11/2021 | Ramamurthy | H02M 1/325 |
| 2009/0121483 A1* | 5/2009 | Xiong | H02P 9/007 290/44 |
| 2009/0200803 A1* | 8/2009 | Ichinose | H02P 9/10 290/44 |
| 2010/0142237 A1 | 6/2010 | Yuan et al. | |
| 2013/0027994 A1* | 1/2013 | Nelson | H02J 3/241 363/40 |
| 2013/0234435 A1* | 9/2013 | Wagoner | H02P 9/007 290/44 |
| 2014/0062424 A1* | 3/2014 | Larsen | H02P 9/007 322/24 |
| 2015/0123475 A1* | 5/2015 | Premm | H02J 3/46 307/24 |
| 2019/0157876 A1* | 5/2019 | Dobrowolski | H02J 3/46 |
| 2019/0214927 A1 | 7/2019 | Letas | |
| 2020/0014306 A1* | 1/2020 | Riar | H02M 3/33584 |
| 2020/0295671 A1* | 9/2020 | Huynh | H02J 3/381 |
| 2021/0033069 A1* | 2/2021 | Lindholm | B64C 39/022 |
| 2021/0047997 A1* | 2/2021 | Abeyasekera | H02J 3/36 |

FOREIGN PATENT DOCUMENTS

| | | |
|---|---|---|
| EP | 2523298 B1 | 11/2012 |
| EP | 3512063 A1 | 7/2019 |
| WO | WO2015131958 A1 | 9/2015 |

OTHER PUBLICATIONS

European Search Report for EP application No. 21211042,3, dated May 11, 2022.

* cited by examiner

SYSTEM AND METHOD FOR PROVIDING GRID-FORMING CONTROL FOR A DOUBLE-FED WIND TURBINE GENERATOR USING VIRTUAL IMPEDANCE

FIELD

The present disclosure relates generally to double-fed wind turbine generators and, more particularly, to systems and methods for providing grid-forming control of a double-fed wind turbine generator using a virtual impedance.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Furthermore, many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g. the turbine control portion of a wind turbine. This is conveyed as a torque reference, which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming (GFM) inverter-based resources (IBR) act as a voltage source behind an impedance and provide a voltage-source characteristic, where the angle and magnitude of the voltage are controlled to achieve the regulation functions needed by the grid. In particular, the impedance of the GFM IBR is normally dictated by the hardware of the system, such as reactors, transformers, or rotating machine impedances. With this structure, current will flow according to the demands of the grid, while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

In particular, as shown in FIG. 2, the grid-forming voltage-source is realized on the stator voltage for implementing grid forming control for a double-fed wind turbine generator using the stator voltage regulator. More specifically, as shown, the stator voltage regulator 50 is configured to receive a higher level command (e.g. $E_I$) for magnitude of the stator voltage and a higher level command (e.g. $\delta_{IT}$) for angle of the stator voltage with respect to the phase-locked loop angle. Further, as shown, the stator voltage regulator 50 can then convert the voltage command(s) to a stator voltage command (e.g. VS_Cmd_xy) as shown at 52. The stator voltage regulator 50 may then determine a magnetizing current feed forward signal (e.g. IM_FF_xy) as a function of the stator voltage command and a magnetizing admittance (e.g. jBmag 54), which may correspond to a magnetizing susceptance. As such, the magnetizing current feed forward signal is configured to facilitate a rapid response of stator voltage to the stator voltage command.

In addition, as shown, the stator voltage regulator 50 may also receive a stator voltage feedback signal (e.g. VS_Fbk_xy) and, as shown at 62, determine a difference between the stator voltage feedback signal and the stator voltage command. Thus, in an embodiment, as shown, the stator voltage regulator 50 may also determine a magnetizing current correction signal (e.g. IM_Corr_xy) via a proportional-integral regulator 232. Accordingly, as shown at 56, the stator voltage regulator 50 can then add the magnetizing current feed forward signal (e.g. IM_FF_xy) to the magnetizing current correction signal (IM_Corr_xy) from the power regulator to determine the magnetizing current command (e.g. IM_Cmd_xy).

Furthermore, as shown at 58, the stator voltage regulator 50 may determine the rotor current command(s) (e.g. IR_Cmd_xy) as a function of the magnetizing current command (e.g. IM_Cmd_xy) and a stator current feedback signal (e.g. IS_Fbk_xy). Thus, in an embodiment, the measured stator current signal may be fed into the rotor current command, as shown at 58, so as to substantially decouple a stator responsive stator voltage from one or more grid characteristics. More specifically, in particular embodiments, as shown, the stator voltage regulator 50 may determine the rotor current command(s) by adding the magnetizing current command to the measured stator current feedback signal. In addition, as shown, a limiter 60 may place limits to the rotor current command as appropriate to respect equipment rating(s). In such systems, however, the impedance of the grid-forming resource is dictated by the hardware of the system, particularly the transformer impedance for this implementation.

Accordingly, systems and methods configured such that the effective impedance can be set as a parameter independent of the equipment physical characteristics would be advantageous. Thus, the present disclosure is directed to a system and method for creating a configurable virtual impedance in a GFM double-fed wind turbine generator to add flexibility in tuning the dynamics of the system.

BRIEF DESCRIPTION

Aspects and advantages of the invention will be set forth in part in the following description, or may be obvious from the description, or may be learned through practice of the invention.

In one aspect, the present disclosure is directed to a method for providing grid-forming control of a double-fed wind turbine generator connected to an electrical grid. The double-fed wind turbine generator has a line-side converter coupled a rotor-side converter via a DC link. The method includes receiving at least one control signal associated with a desired total power output or a total current output of the double-fed wind turbine generator. The method also includes determining a contribution of at least one of power or current from the line-side converter to the desired total power output or to the total current output of the double-fed wind turbine generator, respectively. The method also includes determining a control command for a stator of the double-fed wind turbine generator based on the contribution of at least one of the power or the current from the line-side converter and the at least one control signal. Further, the method includes using the control command to regulate at least one of power or current in the stator of the double-fed wind-turbine generator.

In an embodiment, the control signal(s) associated with the desired total power output or the total current output of the double-fed wind turbine generator may include at least one of a phase angle or a total power command.

In another embodiment, determining the control command for the stator of the double-fed wind turbine generator based on the contribution of at least one of the power or the current from the line-side converter and the at least one control signal may include regulating a total power output using the total power command to produce an angle command and compensating the angle command to produce the control command for the stator of the double-fed wind turbine generator.

In further embodiments, compensating the angle command to produce the control command for the stator of the double-fed wind turbine generator may include estimating a line-side converter power as a function of total power command and a slip of the double-fed wind turbine generator, estimating a compensation angle as a function of the line-side converter power and an internal impedance value of the double-fed wind turbine generator, and compensating the angle command to produce the control command for the stator of the double-fed wind turbine generator using the compensation angle.

In another embodiment, estimating the compensation angle as a function of the line-side converter power and the internal impedance value of the double-fed wind turbine generator may include receiving an electrical frequency and a rotor speed of the double-fed wind turbine generator, determining the slip of the double-fed wind turbine generator as a function of the electrical frequency and the rotor speed, determining a ratio of stator power to total power of the double-fed wind turbine generator using the slip, and calculating the compensation angle as a function of the ratio, the internal impedance value, and the total power command.

In several embodiments, the internal impedance value of the double-fed wind turbine generator may include the internal virtual impedance value and an internal physical impedance value.

In particular embodiments, determining the control command for the stator of the double-fed wind turbine generator based on the contribution of at least one of the power or the current from the line-side converter and the at least one control signal may include receiving a control signal indicative of the total power command, compensating the total power command with the line-side converter power at an input of a power regulator of the double-fed wind turbine generator to produce a stator power control command, and using the stator power control command to regulate stator power of the double-fed wind turbine generator.

In yet another embodiment, the internal impedance value may include an internal virtual impedance value at a node internal of the double-fed wind turbine generator. Thus, in such embodiments, the method may also include determining a voltage deviation across the internal virtual impedance value of the double-fed wind turbine generator using a current feedback signal.

In an embodiment, using the control command to regulate at least one of the power or the current in the stator of the double-fed wind-turbine generator may include determining a difference between the voltage deviation from the internal voltage command to obtain a magnetizing voltage command, calculating a feedforward component using the magnetizing voltage command, determining a magnetizing current command using the feedforward component and a trim component, and calculating one or more rotor current commands for double-fed wind turbine generator using the magnetizing current command and at least one current feedback signal.

In another aspect, the present disclosure is directed to a system for providing grid-forming control of an double-fed wind turbine generator connected to an electrical grid. The double-fed wind turbine generator has a line-side converter coupled a rotor-side converter via a DC link. The system includes a controller having at least one processor configured to perform a plurality of operations, including but not limited to receiving at least one control signal associated with a desired total power output or a total current output of the double-fed wind turbine generator, determining a contribution of at least one of power or current from the line-side converter to the desired total power output or to the total current output of the double-fed wind turbine generator, respectively, determining a control command for a stator of the double-fed wind turbine generator based on the contribution of at least one of the power or the current from the line-side converter and the at least one control signal, and using the control command to regulate at least one of power or current in the stator of the double-fed wind-turbine generator. It should be understood that the system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
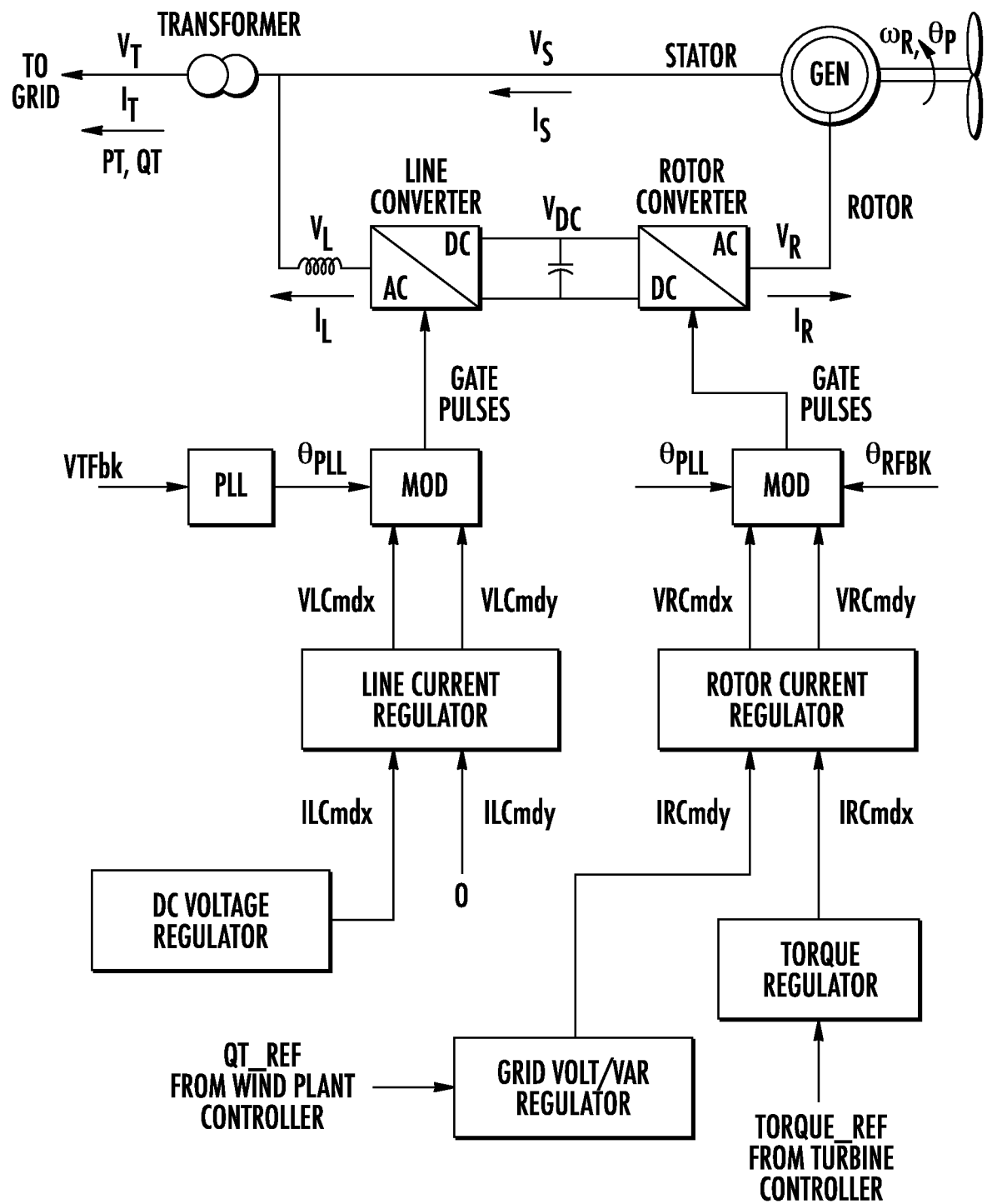
FIG. 1 illustrates a one-line diagram of a double-fed wind turbine generator with structure of converter controls for grid-following application according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and method for providing grid-forming control for a double-fed wind-turbine generator using a virtual impedance. In certain embodiments, the system and method of the present disclosure involve synthesizing a voltage source behind an impedance characteristic, where the voltage source is synthesized within the generator itself behind a virtual impedance. Accordingly, the system and method of the present disclosure involves compensating the voltage command of the grid-forming controls to account for line-side converter contribution to output power. This approach realizes an effective voltage source behind impedance characteristic despite the more complex hardware structure of the double-fed wind-turbine generator (e.g. the parallel line-side converter and the generator).

Figure 3:
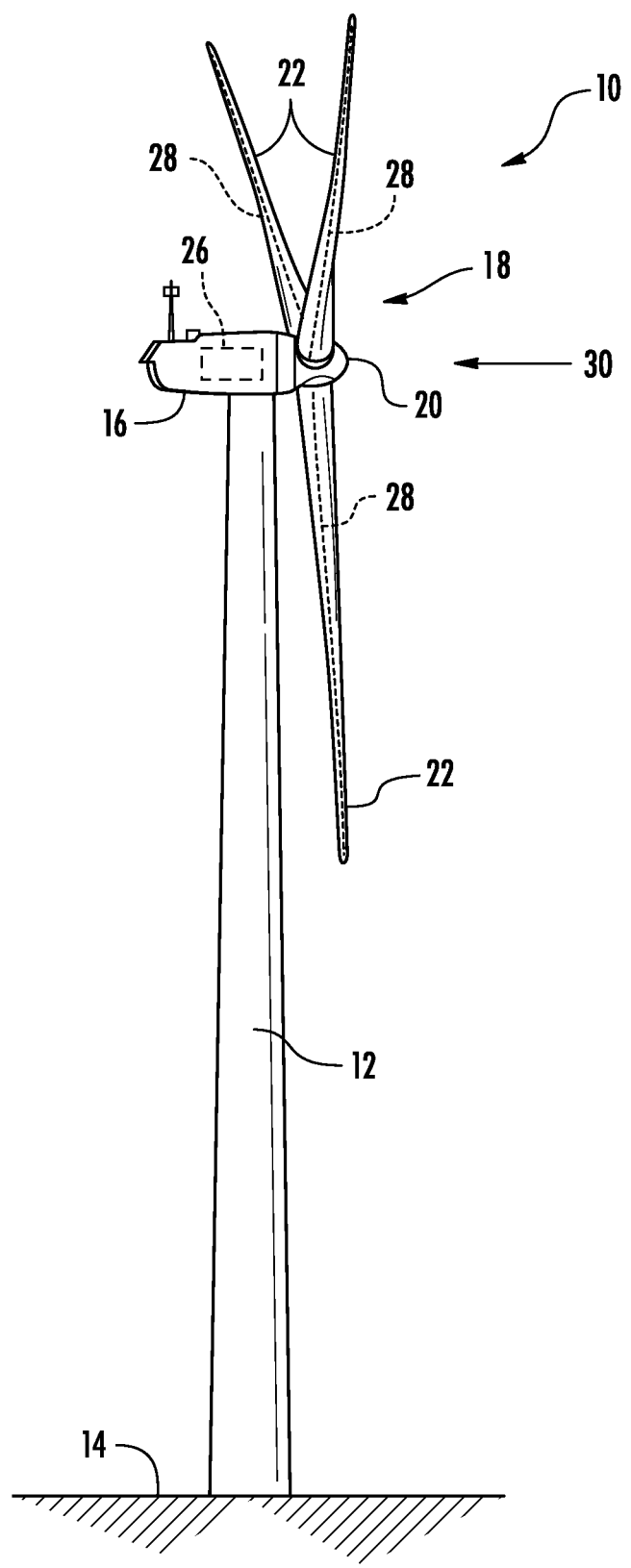
FIG. 3 illustrates a perspective view of one embodiment of a wind turbine according to the present disclosure.

Referring now to the drawings, FIG. 3 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 4) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 4:
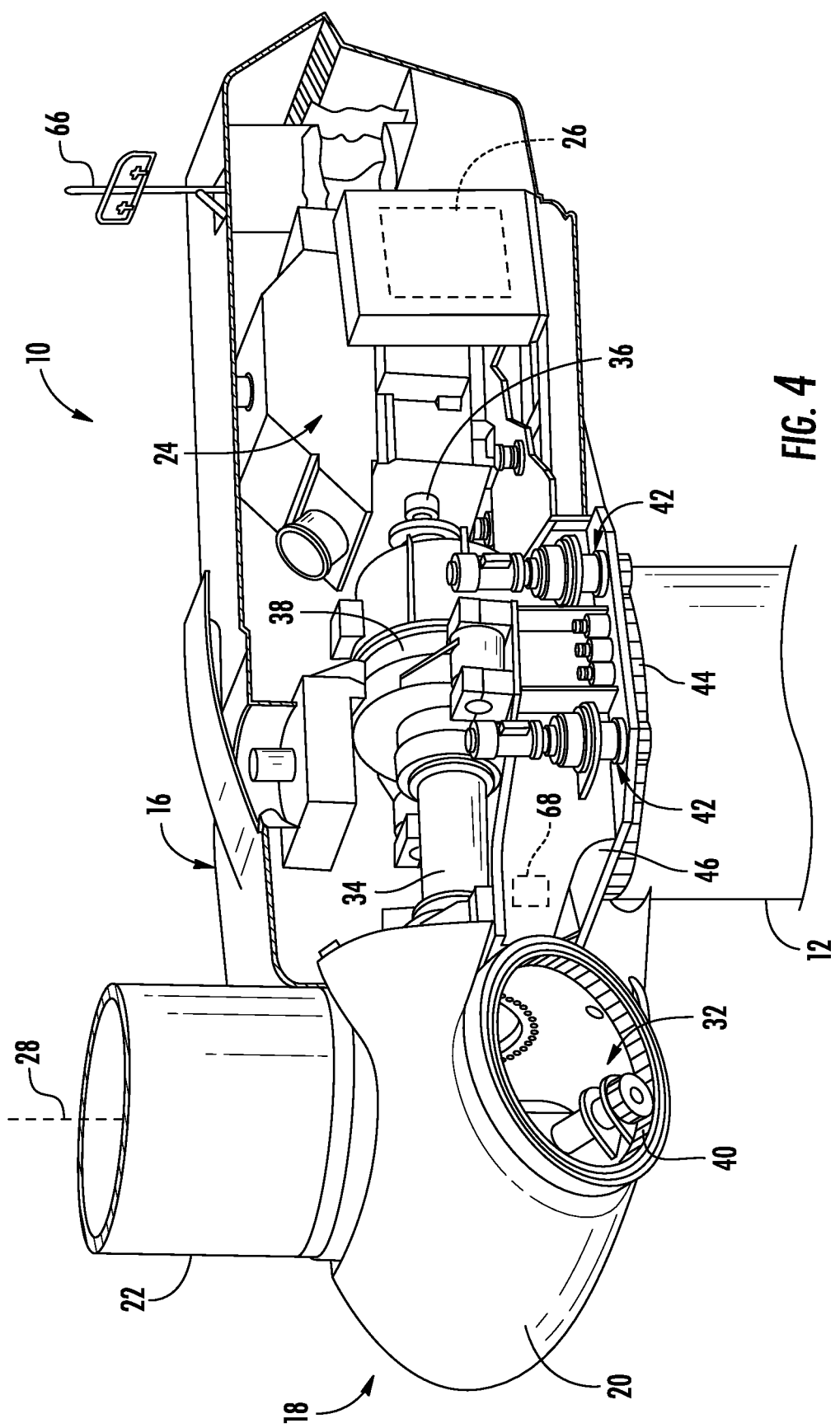
FIG. 4 illustrates a simplified, internal view of one embodiment of a nacelle according to the present disclosure.

Referring now to FIG. 4, a simplified, internal view of one embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 30, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 5:
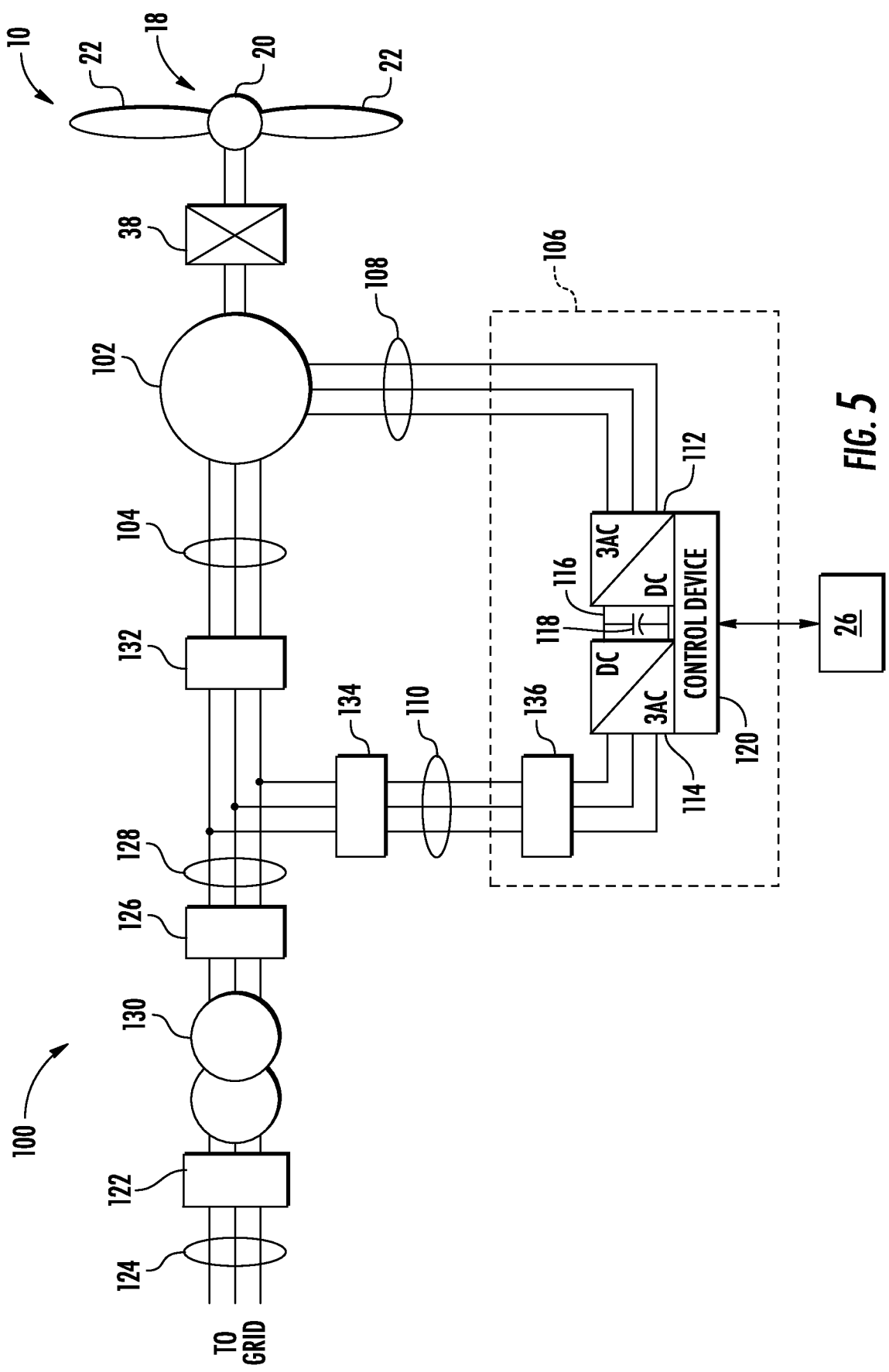
FIG. 5 illustrates a schematic view of one embodiment of a wind turbine electrical power system suitable for use with the wind turbine shown in FIG. 3.
Figure 6:
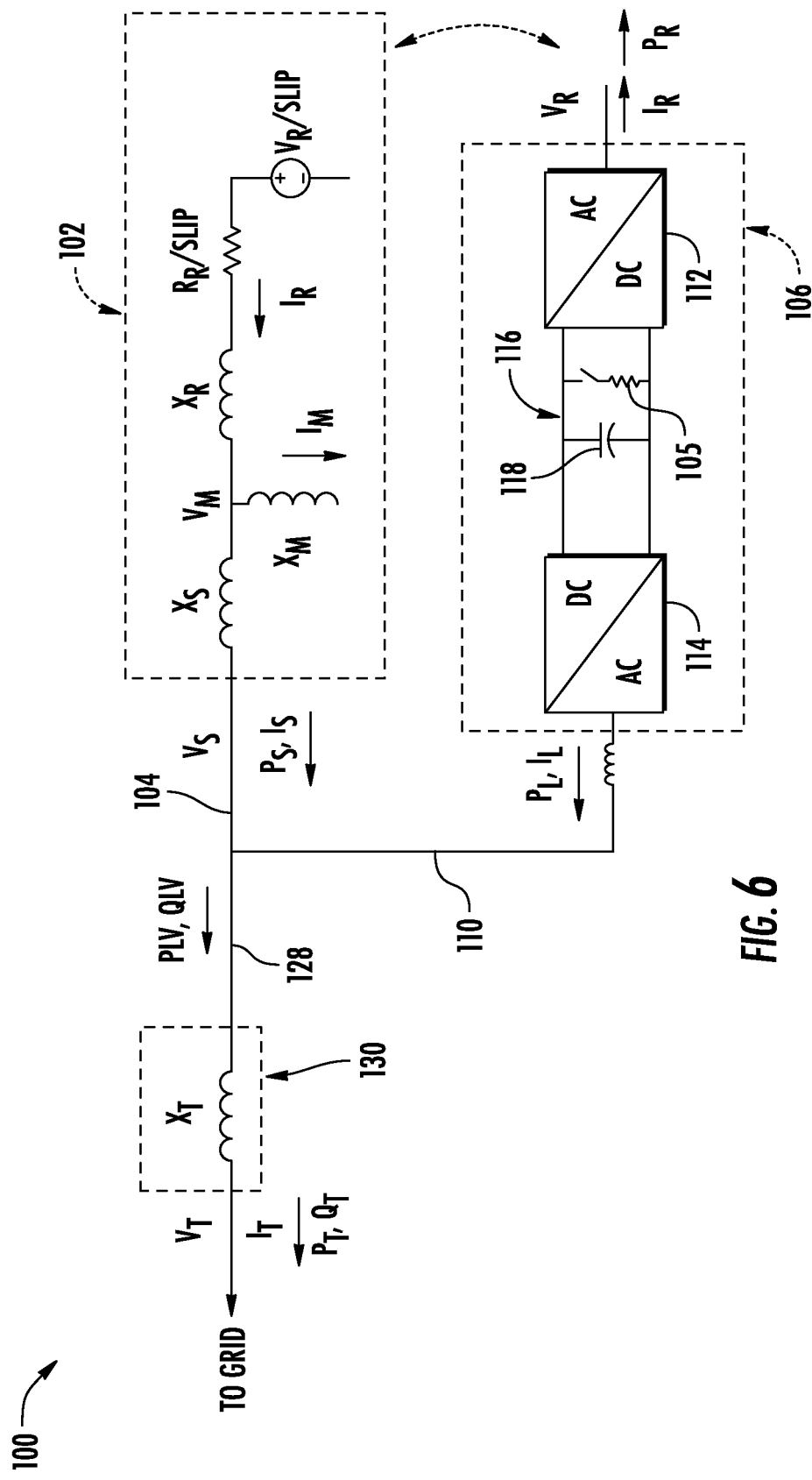
FIG. 6 illustrates a simplified equivalent circuit of a wind turbine electrical power system according to the present disclosure.

Referring now to FIGS. 5 and 6, schematic diagrams of certain embodiments of a wind turbine power system 100 is illustrated in accordance with aspects of the present disclosure. In particular, FIG. 5 illustrates a schematic view of one embodiment of the wind turbine electrical power system 100 suitable for use with the wind turbine shown in FIG. 3, whereas FIG. 6 illustrates a simplified equivalent circuit of the wind turbine electrical power system 100. Although the present disclosure will generally be described herein with reference to the wind turbine electrical power system 100 shown in FIGS. 5 and 6, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 5 and as mentioned, the rotor 18 of the wind turbine 10 (FIG. 3) may, optionally, be coupled to the gearbox 38, which is, in turn, coupled to a generator 102, which may be a doubly fed induction generator (DFIG) as described herein. As shown in FIGS. 5 and 6, the DFIG 102 may be connected to a stator bus 104. Further, as shown in FIGS. 5 and 6, a power converter 106 may be connected to the DFIG 102 via a rotor bus 108, and to the stator bus 104 via a line side bus 110. As such, the stator bus 104 may provide an output multiphase power (e.g. three-phase power) from a stator of the DFIG 102, and the rotor bus 108 may provide an output multiphase power (e.g. three-phase power) from a rotor of the DFIG 102. The power converter 106 may also include a rotor side converter (RSC) 112 and a line side converter (LSC) 114. The DFIG 102 is coupled via the rotor bus 108 to the RSC 112. Additionally, the RSC 112 is coupled to the LSC 114 via a DC link 116 across which is a DC link capacitor 118. The LSC 114 is, in turn, coupled to the line side bus 110. The power converter 106 may also include a dynamic brake 105 as shown in FIG. 6.

The RSC 112 and the LSC 114 may be configured for normal operating mode in a three-phase, pulse width modulation (PWM) arrangement using one or more switching devices, such as insulated gate bipolar transistor (IGBT) switching elements. In addition, as shown in FIG. 5, the power converter 106 may be coupled to a converter controller 120 in order to control the operation of the RSC 112 and/or the LSC 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g. three-phase) alternating current (AC) power is provided to the power converter 106. The RSC 112 converts the AC power provided from the rotor bus 108 into direct current (DC) power and provides the DC power to the DC link 116. As is generally understood, switching elements (e.g. IGBTs) used in the bridge circuits of the RSC 112 may be modulated to convert the AC power provided from the rotor bus 108 into DC power suitable for the DC link 116.

In addition, the LSC 114 converts the DC power on the DC link 116 into AC output power suitable for the electrical grid 124. In particular, switching elements (e.g. IGBTs) used in bridge circuits of the LSC 114 can be modulated to convert the DC power on the DC link 116 into AC power on the line side bus 110. The AC power from the power converter 106 can be combined with the power from the stator of DFIG 102 to provide multi-phase power (e.g. three-phase power) having a frequency maintained substantially at the frequency of the electrical grid 124 (e.g. 50 Hz or 60 Hz).

Additionally, as shown in FIG. 5, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g. three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring particularly to FIG. 6, as mentioned, a one-line circuit diagram of the wind turbine power system 100 is illustrated. In particular, as shown, the power ($P_T$) generated by the wind turbine power system 100 is the sum of the power from the generator stator ($P_S$) and the LSC 114 ($P_L$), given by Equation (1) below:

$$P_T = P_S + P_L \qquad \text{Equation (1)}$$

Further, the power from the LSC 114 ($P_L$) can be approximated by assuming all the power from the rotor ($P_R$) of the DFIG 102 passes to the LSC 114, as given in Equation (2) below:

$$P_L \approx -P_R = -\text{slip} * P_S \qquad \text{Equation (2)}$$

wherein the slip is defined by the relationship of Equation (3) provided below:

$$\text{slip} = \omega_{elec} - \omega_{rot}/\omega_{elec} \qquad \text{Equation (3)}$$

wherein $\omega_{elec}$ is the electrical frequency of the wind turbine power system 100, and $\omega_{rot}$ is the rotor speed of the rotor 18 of the wind turbine power system 100.

Thus, in an embodiment, by combining the aforementioned relationships, the ratio of the stator power ($P_S$) to the total power ($P_T$) can be expressed using Equation (4) below:

$$P_S/P_T = 1/(1-\text{slip}) \qquad \text{Equation (4)}$$

Still further relationships illustrated in FIG. 6, such as voltage (V), current (I), and impedance (X), etc., will be described in more detail herein.

Figure 7:
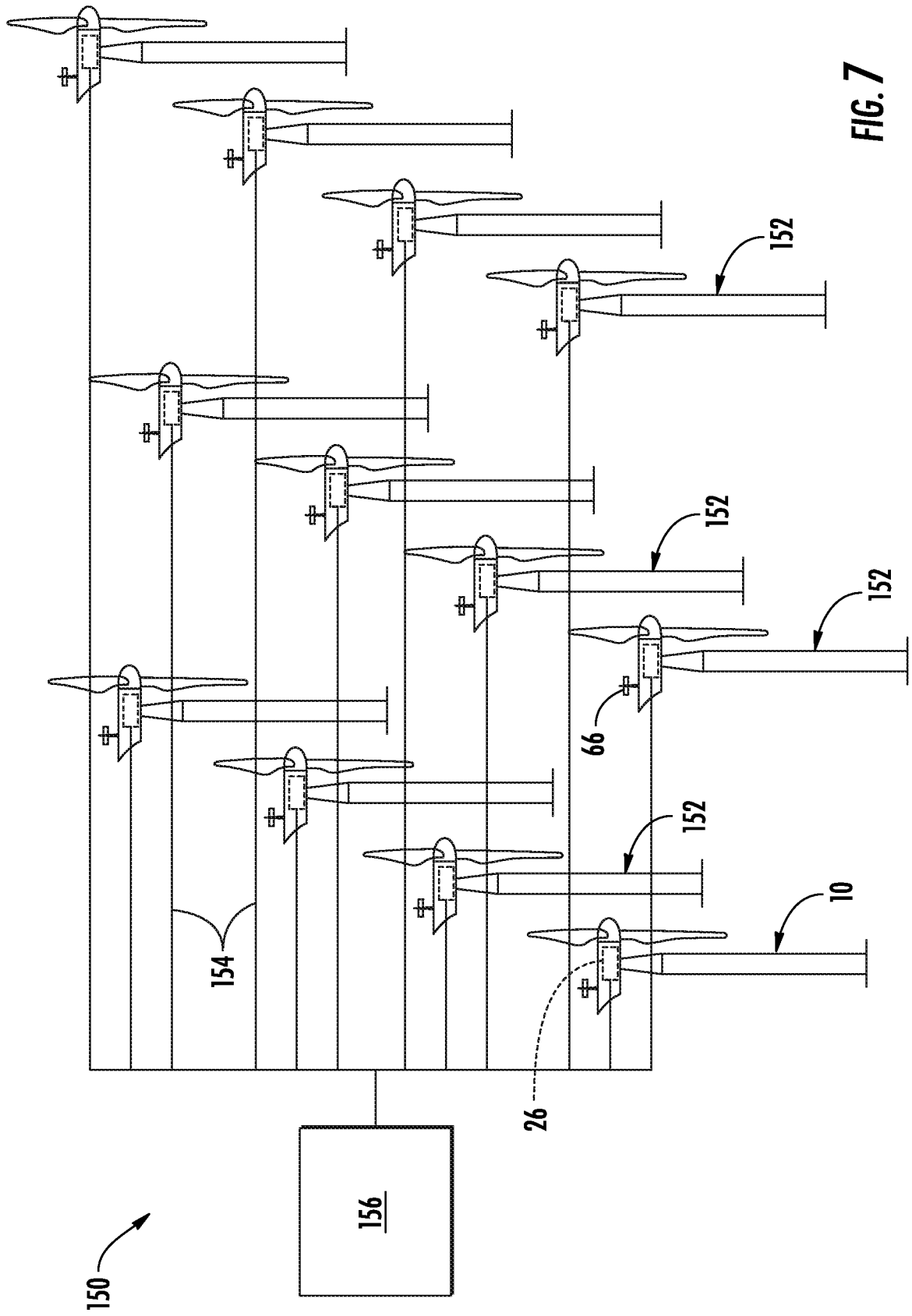
FIG. 7 illustrates a schematic view of one embodiment of a wind farm having a plurality of wind turbines according to the present disclosure.

Referring now to FIG. 7, the wind turbine power system 100 described herein may be part of a wind farm 150. As shown, the wind farm 150 may include a plurality of wind turbines 152, including the wind turbine 10 described above, and an overall farm-level controller 156. For example, as shown in the illustrated embodiment, the wind farm 150 includes twelve wind turbines, including wind turbine 10. However, in other embodiments, the wind farm 150 may include any other number of wind turbines, such as less than twelve wind turbines or greater than twelve wind turbines. In one embodiment, the turbine controllers of the plurality of wind turbines 152 are communicatively coupled to the farm-level controller 156, e.g. through a wired connection, such as by connecting the turbine controller 26 through suitable communicative links 154 (e.g., a suitable cable). Alternatively, the turbine controllers may be communicatively coupled to the farm-level controller 156 through a wireless connection, such as by using any suitable wireless communications protocol known in the art. In further embodiments, the farm-level controller 156 is configured to send and receive control signals to and from the various wind turbines 152, such as for example, distributing real and/or reactive power demands across the wind turbines 152 of the wind farm 150.

Figure 8:
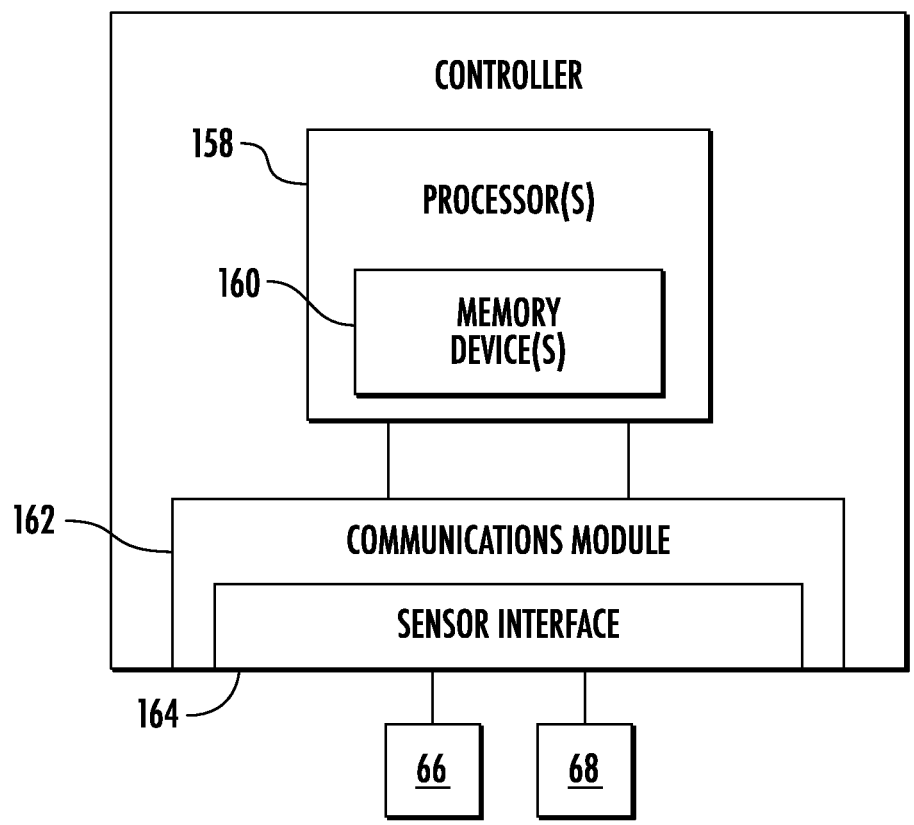
FIG. 8 illustrates a block diagram of one embodiment of a controller according to the present disclosure.

Referring now to FIG. 8, a block diagram of one embodiment of suitable components that may be included within the controller (such as any one of the turbine controller 26, the converter controller 120, and/or the farm-level controller 156 described herein) in accordance with example aspects of the present disclosure is illustrated. As shown, the controller may include one or more processor(s) 158, computer, or other suitable processing unit and associated memory device(s) 160 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 160 may generally be configured to store suitable computer-readable instructions that, when implemented by the processor(s) 158, configure the controller to perform various functions as described herein. Additionally, the controller may also include a communications interface 162 to facilitate communications between the controller and the various components of the wind turbine 10. An interface can include one or more circuits, terminals, pins, contacts, conductors, or other components for sending and receiving control signals. Moreover, the controller may include a sensor interface 164 (e.g., one or more analog-to-digital converters) to permit signals transmitted from the sensors 66, 68 to be converted into signals that can be understood and processed by the processor(s) 58.

Figure 9:
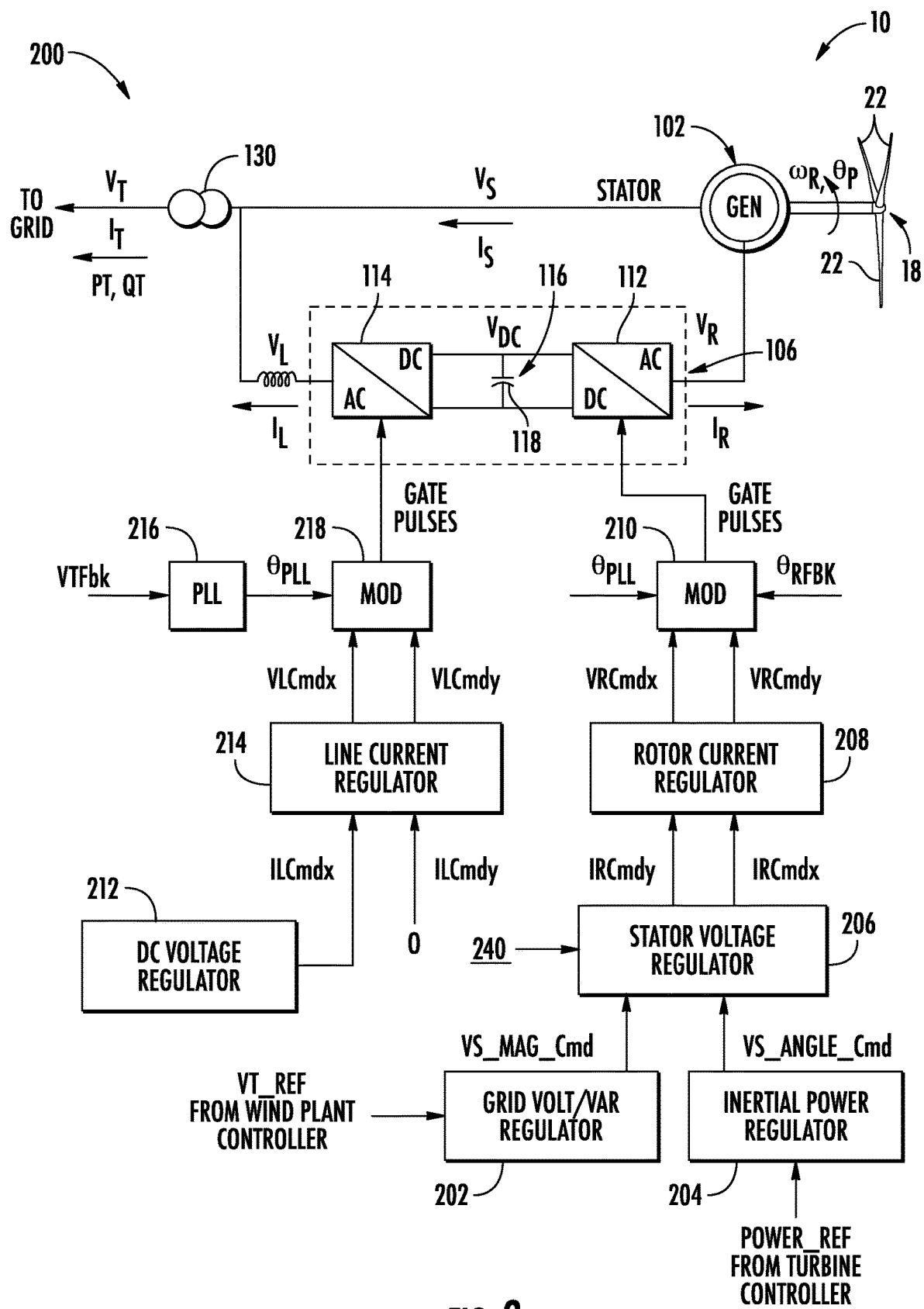
FIG. 9 illustrates a one-line diagram of a double-fed wind turbine generator with converter controls for grid-forming application according to the present disclosure.

Referring now to FIG. 9, a schematic diagram of one embodiment of a system 200 for providing grid-forming control of a double-fed generator of a wind turbine according to the present disclosure is illustrated. More specifically, as shown, the system 200 may include many of the same features of FIG. 5 described herein, with components having the same reference characters representing like components. Further, as shown, the system 200 may include a control structure for controlling the line-side converter that is similar to the control structure shown in FIG. 5.

Moreover, as shown, the LSC control structure may include a DC regulator 212 and a line current regulator 214. The DC regulator 212 is configured to generate line-side current commands for the line current regulator 214. The line current regulator 214 then generates line-side voltage commands for a modulator 218. The modulator 218 also receives an output (e.g. a phase-locked loop angle) from a phase-locked loop 216 to generate one or more gate pulses for the LSC 114. The phase-locked loop 216 typically generates its output using a voltage feedback signal.

Furthermore, as shown, the system 200 may also include a control structure for controlling the RSC 112 using grid-forming characteristics. In particular, as shown in FIG. 9, the system 200 may include a stator voltage regulator 206 for providing such grid-forming characteristics. In addition, as shown, the system 200 may include a grid voltage/VAR regulator 202, an inertial power regulator 204, a rotor current regulator 208, and a modulator 210.

In an embodiment, the grid volt/VAR regulator 202 receives a voltage reference (e.g. VT_REF) from the farm-level controller 156 and generates a stator voltage magnitude command (e.g. VS_Mag_Cmd), whereas the inertial power regulator receives a power reference from the turbine controller 26 and generates a stator voltage angle command (e.g. VS_Angle_Cmd). More specifically, in an embodiment, as shown, the stator voltage regulator 206 determines one or more rotor current commands (e.g. IRCmdy and IRCmdx) as a function of the stator voltage magnitude command, the stator voltage angle command, and/or a stator current feedback signal 240 of the double-fed generator 120. It should be understood that the stator feedback current 240 is a strong indicator of the characteristics of the externally connected power system, i.e. the grid. Therefore, the stator feedback current 240 can be used as a feedback signal to decouple the response of stator voltage to variations to the nature of the grid. Further details relating to the stator voltage regulator 206 are further explained and described in PCT/US2020/013787 entitled "System and Method for Providing Grid-Forming Control for a Doubly-Feb Wind Turbine Generator," which is incorporated herein by reference in its entirety.

As mentioned, with grid-forming control, current changes rapidly when there are grid disturbances. Further, the control action is gradual to restore the steady-state operating conditions commanded by higher-level controls. The amount of current change is inversely related to the total impedance of the circuit. However, if the current exceeds limits, then the control responds rapidly to force the current to be within limits. This drastic nonlinearity can cause chaotic behavior when applied to a grid consisting of many other similar systems. Alternatively, if the current change is too small, then the grid-forming system will not contribute as much as it could to support the grid.

Figure 10:
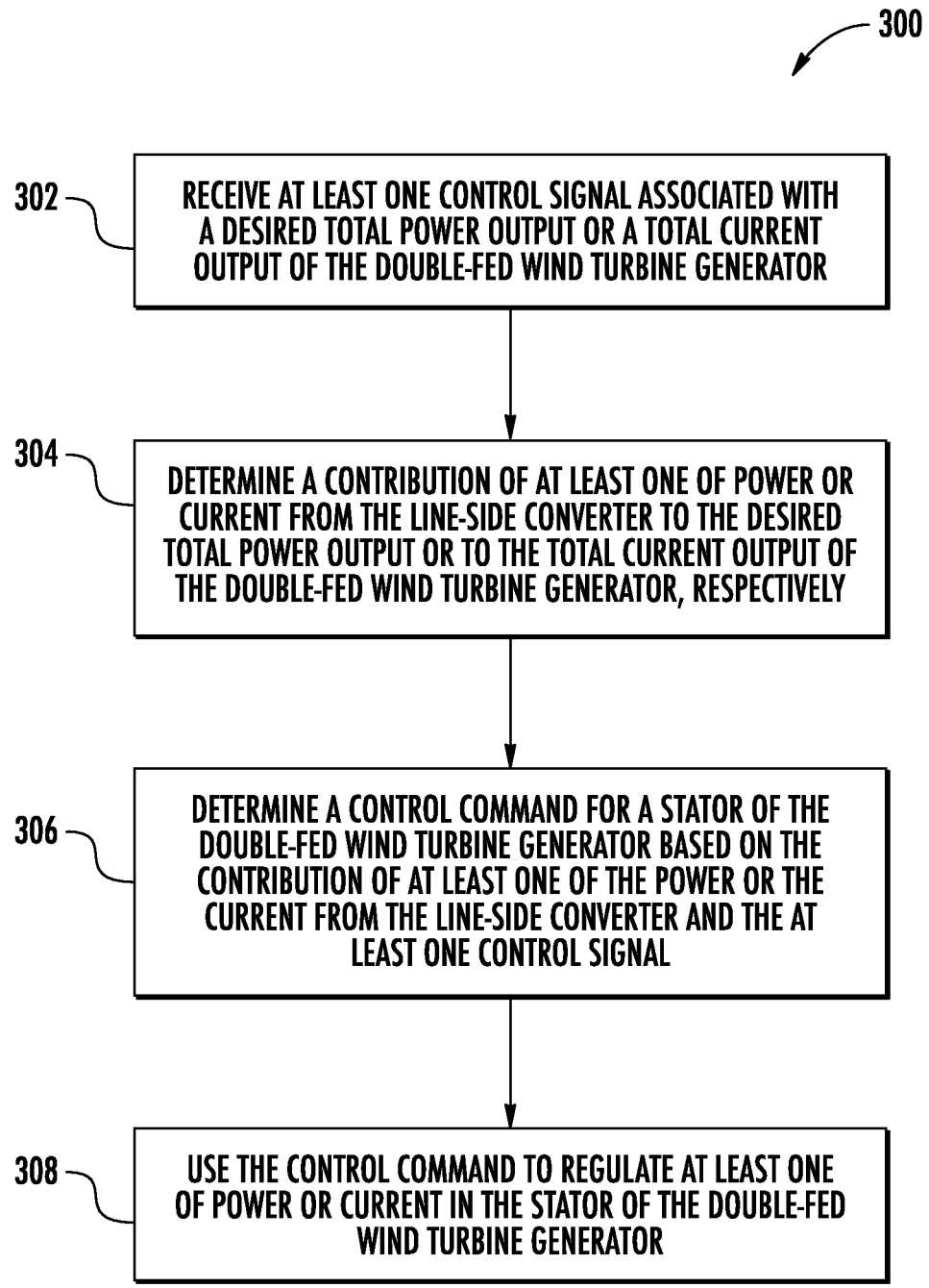
FIG. 10 illustrates a flow diagram of one embodiment of method for providing grid-forming control of a double-fed wind turbine generator connected to an electrical grid according to the present disclosure.

Thus, FIGS. 10 through 13 generally describe a system 400 and method 300 for providing grid-forming control of a double-fed wind turbine generator, such as DFIG 102, using at least one virtual impedance. Referring particularly to FIG. 10, a flow diagram of one embodiment of a method 300 for providing grid-forming control of the DFIG 102 using at least one virtual impedance according to the present disclosure is illustrated. It should be appreciated that the disclosed method 300 may be implemented with any suitable double-fed wind turbine generator having any suitable configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes receiving at least one control signal associated with a desired total power output or a total current output of the DFIG 102. For example, in an embodiment, the control signal(s) associated with the desired total power output or the total current output of the DFIG 102 may include a phase angle or a total power command. As shown at (304), the method 300 includes determining a contribution of at least one of power or current from the LSC 114 to the desired total power output or to the total current output of the DFIG 102, respectively. As shown at (306), the method 300 includes determining a control command for the stator of the DFIG 102 based on the contribution of at least one of the power or the current from the LSC 114 and the control signal(s). As shown at (308), the method 300 includes using the control command to regulate at least one of power or current in the stator of the DFIG 102.

Figure 11:
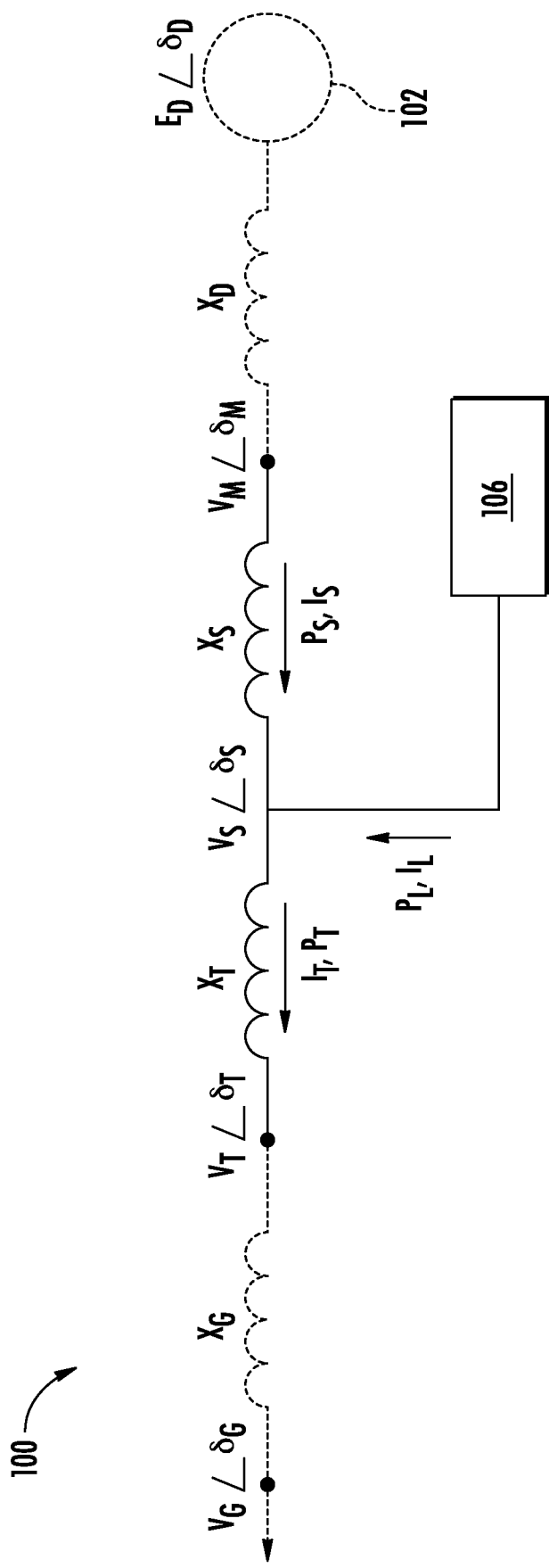
FIG. 11 illustrates an equivalent circuit of a grid forming double-fed wind turbine generator with a virtual impedance according to the present disclosure.
Figure 12:
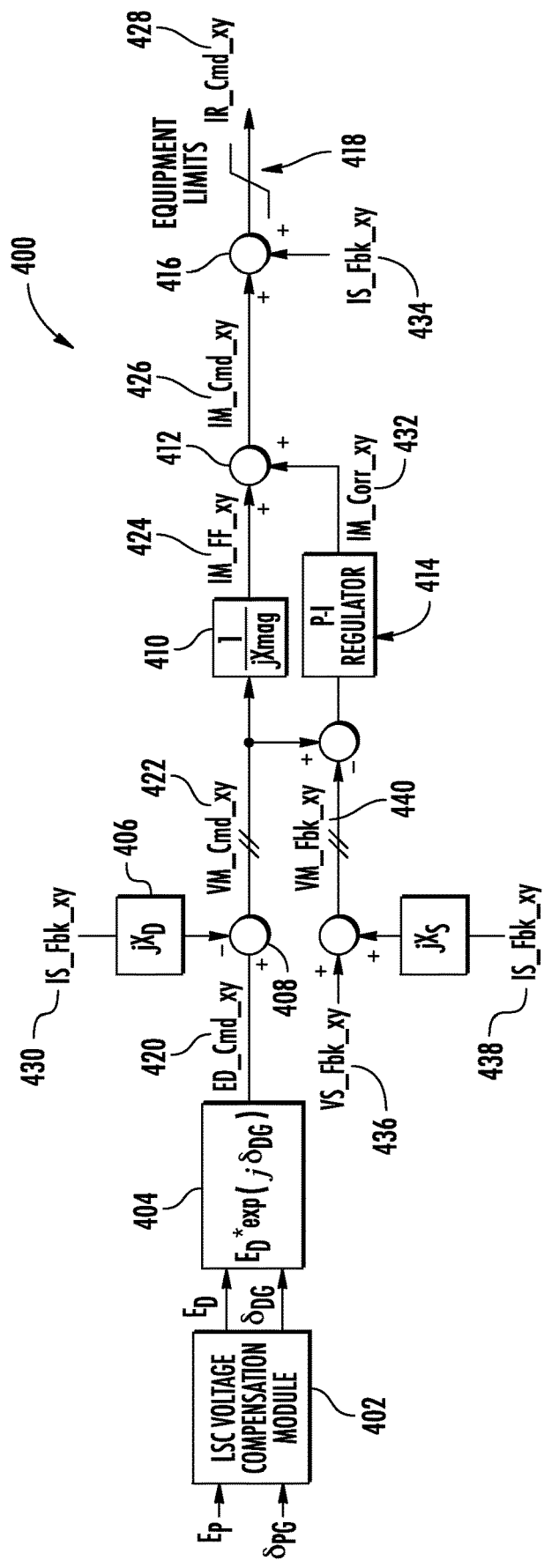
FIG. 12 illustrates a schematic diagram of one embodiment of control logic for implementation of a grid forming double-fed wind turbine generator with a virtual impedance value being used according to the present disclosure.

The method 300 of FIG. 10 can be better understood with reference to FIGS. 11 and 12. More specifically, as shown in FIG. 11, an equivalent circuit of the grid forming DFIG 102 with a virtual impedance according to the present disclosure is illustrated. In particular, the components indicated in phantom are representative of "virtual" components in that, such components are not actual hardware of the wind turbine power system 100, but rather, are provided or mimicked using software of the resource. Furthermore, with reference to FIGS. 6 and 11, components having the same reference variables represent like variables. Thus, as shown in FIG. 11, the equivalent circuit may include virtual impedance value(s), such as an internal virtual impedance value $X_D$ at a node internal of the double-fed wind turbine generator 102 and/or an external virtual impedance value $X_G$ at a node external of the DFIG 102.

Thus, in certain embodiments, two virtual impedances may be implemented, each with a certain purpose as related to the active power dynamics of the system. For example, in an embodiment, the internal virtual impedance may allow for tuning an active power output of the wind turbine power system 100 for changes in external network angle. In another embodiment, the external virtual impedance may allow for tuning of a grid angle estimation through the phase-locked loop for changes in active power output of the grid-forming resource. In such embodiments, the multiple degrees of freedom allow for configuration and tuning of active power dynamics for grid-forming converter controls with various hardware types as well as various types of external networks.

As used herein, a tunable "virtual" impedance value generally refers to impedance behavior that can be mimicked by a system, rather than the impedance being provided by a particular component (such as an inductor). Thus, the virtual or effective impedance can be a fixed value determined by studies of the application scenario. Alternatively, the virtual impedance may be a variable, e.g. as determined by a control logic that adapts to measured grid conditions. In one embodiment, as an example, a larger effective impedance can be used to reduce the extreme nonlinearity associated with the rapid rise into the current limiting region, e.g. during a grid fault. Thus, upon fault clearing, the larger virtual impedance allows for inrush current to be within limits. After the grid fault, the virtual impedance may then be lowered as grid voltage recovers so that the converter contributes to supporting the grid while operating within its linear region. In addition, in an embodiment, a lower effective impedance can be used to improve the support provided to the grid for milder events.

In addition, as shown in FIG. 11, the voltage source for an implementation of the present disclosure reflects a synthesized voltage ($E_D$) within the DFIG 102. Further, in an embodiment, the internal impedance in series with the synthesized voltage 466 (e.g. see $E_D$ in FIGS. 11 and 13) represents a combination of the stator leakage reactance (Xs) of the DFIG 102 and an internal virtual impedance ($X_D$), as set forth below in Equation (5), where $I_S$ the stator current, and $V_S$ is the stator voltage:

$$V_S = E_D - j*(X_S + X_D)*I_S \quad \text{Equation (5)}$$

The electrical equation describing the magnetizing voltage $V_M$ of the physical circuit in FIG. 11 is given by Equation (6) below:

$$V_M = V_S + jX_S * I_S \quad \text{Equation (6)}$$

Using this physical relationship together with the Equation (5), the synthesized grid-forming voltage behind the virtual impedance can be related to the physical magnetizing voltage $V_M$ using Equation (7) below:

$$V_M = E_D - j*X_D*I_S \quad \text{Equation (7)}$$

The voltages $V_S$ and $V_T$ in FIG. 11 represent the stator voltage and the terminal voltage, respectively. Further, $X_T$ represents the transformer reactance, $I_T$ is the sum of the LSC current $I_L$ and the stator current $I_S$ in the DFIG 102, and $X_G$ is the external virtual impedance.

Referring now to FIG. 12, a schematic diagram of one embodiment of a system 400 for implementation of the grid forming DFIG 102 with a virtual impedance value being used according to the present disclosure is illustrated. In particular, as shown, the system 200 is configured to receive one or more control signals of the DFIG 102. For example, in an embodiment, as shown in FIG. 12, the control signal(s) may include a phase angle $\delta_{PG}$ or a total power command $E_P$, e.g. with respect to the phase-locked loop for a voltage to be synthesized behind an impedance $X_{TERM}$. More specifically, as shown below, the impedance $X_{TERM}$ may be defined by Equation (8) below:

$$X_{TERM} = X_G + X_D + X_S + X_T \quad \text{Equation (8)}$$

Thus, as shown, the system 400 may also include a LSC voltage compensation module 402 for determining a contribution of at least one of power or current from the LSC 114 to the desired total power output or to the total current output of the DFIG 102, respectively. For example, in an embodiment, as shown in FIG. 12, the LSC voltage compensation module 402 is configured to generate the synthesized voltage $E_D$ and the phase angle $\delta_{DG}$ that can be used to determine a control command 420 (ED_Cmd_xy) for the stator of the DFIG 102 via block 404 based on the contribution of at least one of the power or the current from the LSC 114 and the control signal(s).

Figure 2:
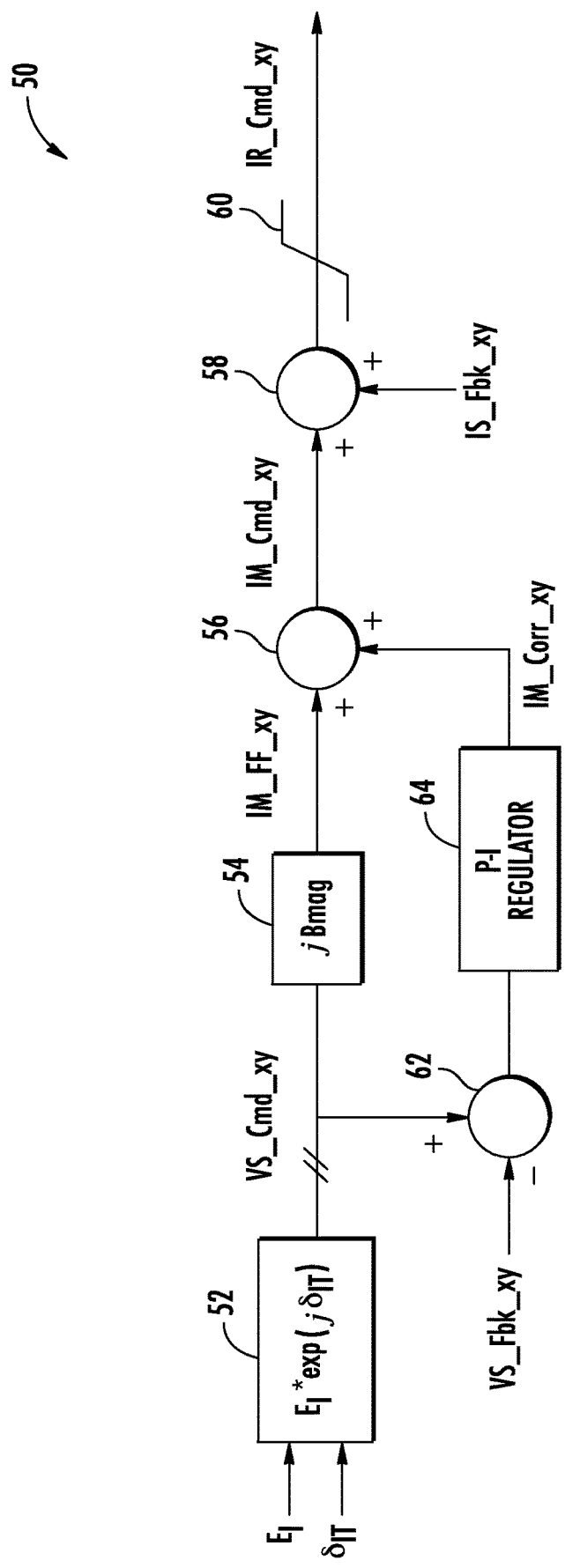
FIG. 2 illustrates a schematic diagram of one embodiment of a grid forming stator voltage regulator of a double-fed wind turbine generator according to the present disclosure.

Still referring to FIG. 12, the magnetizing voltage command 422 (VM_Cmd_xy) may then be calculated from the control command 420 (ED_Cmd_xy) using Equation (7) above. The rotor current commands 428 (IR_Cmd_xy) can then be calculated from a feed-forward term 424 (IM_FF_xy) based on an estimated magnetizing reactance of the DFIG 102 and a trim component (IM_Corr_xy), similar to the method described with respect to FIG. 2.

Figure 13:
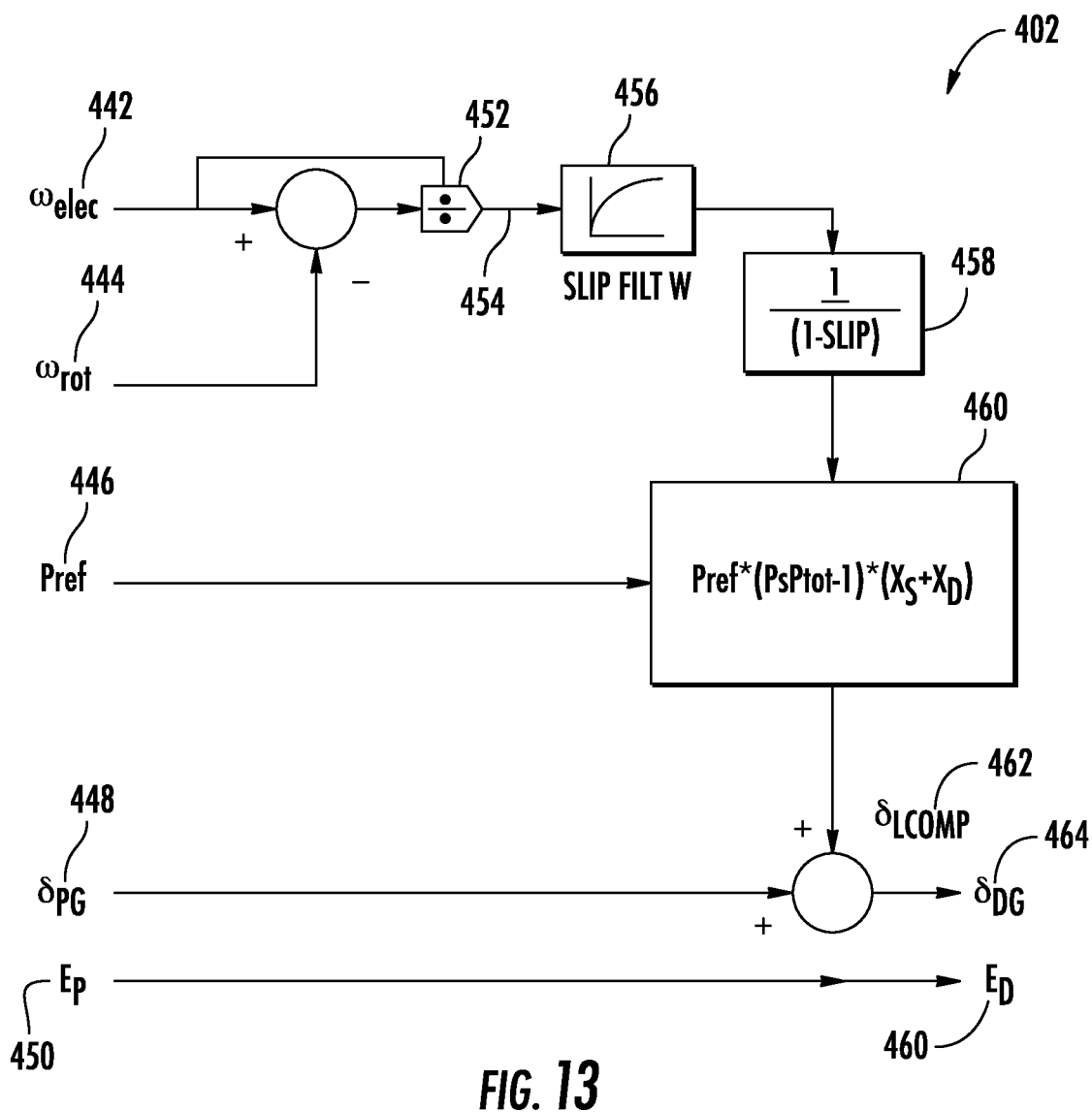
FIG. 13 illustrates a schematic diagram of one embodiment of a line-side converter voltage compensation module according to the present disclosure.

Referring now to FIG. 13, a schematic diagram of one implementation of the LSC voltage compensation module 402 according to the present disclosure is illustrated. In the illustrated example, the LSC voltage compensation module 402 assumes that the LSC 114 injects no reactive power/current. However, in alternative embodiments, the LSC voltage compensation module 402 can be modified to account for these effects by compensating the voltage magnitude rather than the angle command. Additionally, the angle compensation method can be further modified to account for power losses or operation of a dynamic brake element, e.g. the dynamic brake 105 of FIG. 6.

As shown, the input voltage command to the control in FIG. 12 reflects the voltage command 450 $E_P$ with phase angle 448 $\delta_{PG}$ behind a reactance $X_{TERM}$. The relevant power equation is given as Equation (9) below:

$$P_T = (E_P * V_G / X_{TERM}) * \sin(\delta_{DG}) \approx (E_P * V_G / X_{TERM}) * (\delta_{PG}) \quad \text{Equation (9)}$$

As set forth above, Equation (9) considers power flow between two nodes connected together through reactance $X_{TERM}$. In the hardware structure of the DFIG 102, however, not all of the power flow from the system passes through all elements of $X_{TERM}$. Additionally, the power flow through the system depends on the operating speed of the DFIG 102, therefore, the voltage that is synthesized within the DFIG 102 to achieve a certain power flow depends on the operating speed of the DFIG 102. To compensate for this speed dependence, the LSC voltage compensation module 402 is configured to estimate the LSC compensation angle ($\delta_{LCOMP}$) considering only active power flow from the LSC 114. For example, as shown in FIG. 13, the LSC voltage compensation module 402 may also receive an electrical frequency $\omega_{elec}$ 442 and the rotor speed $\omega_{rot}$ 444 of the DFIG 102. As shown at 452, the LSC voltage compensation module 402 may then determine the slip 454 of the DFIG 102 as a function of the electrical frequency 442 and the rotor speed 444. Furthermore, as shown, the LSC voltage compensation module 402 may also filter the slip 454 via one or more filters 456. In addition as shown at box 458, the LSC voltage compensation module 402 may determine a ratio (i.e. $P_S P_{TOT}$) of the stator power to the total power of the DFIG 102. Further, the LSC power can be estimated using this ratio and the total power as represented by Equation (10) below:

$$P_L = -P_T^*(P_S P_{TOT} - 1).$$  Equation (10)

Moreover, as shown at box 460, the LSC voltage compensation module 402 may then calculate the compensation angle $\delta_{LCOMP}$ 462 as a function of the ratio, the internal impedance value, and/or a power reference 446 (Pref), e.g. using Equation (10) below:

$$\delta_{LCOMP} \approx -P_L^*(X_S + X_D)/(V_S E_D) = P_{REF}^*(((P_S P_{TOT} - 1)(X_S + X_D))/V_S E_D) \approx P_T^*((P_S P_{TOT} - 1)(X_S + X_D))$$  Equation (11)

wherein $P_S$ represents stator power,
$P_{REF}$ represents total power reference, and
$X_S + X_D$ represents an internal impedance value of the DFIG 102, where $X_D$ is the internal virtual impedance value of the DFIG 102 and $X_S$ is internal physical impedance value. Further, in such embodiments, the LSC power is embedded in Equation (11) by the relationship in Equation (10).

Accordingly, the LSC compensation angle $\delta_{LCOMP}$ considers that the power from the LSC 114 does not flow through the generator impedance (e.g. $X_S + X_D$). Thus, the internal angle 464 ($\delta_{DG}$) of the generator voltage is related to the angle command as shown in Equation (10) below:

$$\delta_{DG} \approx \delta_{PG} + \delta_{LCOMP}$$  Equation (12)

Referring back to FIG. 12, as shown at 406, the system 400 may also determine a voltage deviation across the internal virtual impedance value of the DFIG 102 using a current feedback signal 430 (IS_Fbk_xy). Thus, as shown at 408, the system 400 can determine the magnetizing voltage command 422 (VM_Cmd_xy) as a function of the control command 420 (ED_Cmd_xy) and the voltage deviation.

Referring back to FIG. 10, as shown at (308), the method 300 then includes determining a control signal for the DFIG 102 as a function of, at least, the control command 420 (ED_Cmd_xy). More particularly, as shown at 410 of FIG. 12, the system 400 may calculate the feedforward component 424 (IM_FF_xy) using the magnetizing voltage command 422 (VM_Cmd_xy). As mentioned, the system 400 can then determine a magnetizing current command 426 (IM_Cmd_xy) using the feedforward component 424 (IM_FF_xy) and a magnetizing current correction signal 432 (IM_Corr_xy) (which may also be referred to herein as a trim component. In particular, as shown, the trim component 432 (IM_Corr_xy) may be an output of a power regulator 414 of the wind turbine power system 100.

In particular, as shown, the system 400 may receive a stator voltage feedback signal 436 (VS_Fbk_xy) and/or a stator current feedback signal 438 (IS_Fbk_xy) may sum the feedback signals together to determine a magnetizing voltage feedback signal 440 (VM_Fbk_xy). Thus, in an embodiment, as shown, the system 400 may determine the magnetizing current correction signal 432 (IM_Corr_xy) via the power regulator 414. Accordingly, as shown at 412, the system 400 can then add the magnetizing current feed forward signal 424 (IM_FF_xy) to the magnetizing current correction signal 432 (IM_Corr_xy) from the power regulator 414 to determine the magnetizing current command 426 (IM_Cmd_xy).

Furthermore, as shown at 416, the system 400 can then calculate one or more rotor current commands 428 (IR_Cmd_xy) for DFIG 102 using the magnetizing current command 426 (IM_Cmd_xy) and at least one current feedback signal 434 (IS_Fbk_xy). In addition, as shown, the system 400 may also include a limiter 418 for limiting the one or more rotor current commands using upper and lower limits.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing grid-forming control of a double-fed wind turbine generator connected to an electrical grid, the double-fed wind turbine generator having a line-side converter coupled a rotor-side converter via a DC link, the method comprising:
   receiving at least one control signal associated with a desired total power output or a total current output of the double-fed wind turbine generator, wherein the at least one control signal associated with the desired total power output or the total current output of the double-fed wind turbine generator comprises at least one of a phase angle or a total power command;
   determining a contribution of at least one of power or current from the line-side converter to the desired total power output or to the total current output of the double-fed wind turbine generator, respectively;
   determining a control command for a stator of the double-fed wind turbine generator based on the contribution of at least one of the power or the current from the line-side converter and the at least one control signal, wherein determining the control command for the stator further comprises regulating a total power output using the total power command to produce an angle command and compensating the angle command to produce the control command for the stator; and
   using the control command to regulate at least one of power or current in the stator of the double-fed wind-turbine generator.

2. The method of claim 1, wherein compensating the angle command to produce the control command for the stator of the double-fed wind turbine generator further comprises:
   estimating a line-side converter power as a function of total power command and a slip of the double-fed wind turbine generator;
   estimating a compensation angle as a function of the line-side converter power and an internal impedance value of the double-fed wind turbine generator; and
   compensating the angle command to produce the control command for the stator of the double-fed wind turbine generator using the compensation angle.

3. The method of claim 2, wherein estimating the compensation angle as a function of the line-side converter power and the internal impedance value of the double-fed wind turbine generator further comprises:
   receiving an electrical frequency and a rotor speed of the double-fed wind turbine generator;

determining the slip of the double-fed wind turbine generator as a function of the electrical frequency and the rotor speed;

determining a ratio of stator power to total power of the double-fed wind turbine generator using the slip; and calculating the compensation angle as a function of the ratio, the internal impedance value, and the total power command.

4. The method of claim 3, wherein the internal impedance value of the double-fed wind turbine generator comprises the internal virtual impedance value and an internal physical impedance value.

5. The method of claim 1, wherein determining the control command for the stator of the double-fed wind turbine generator based on the contribution of at least one of the power or the current from the line-side converter and the at least one control signal further comprises:

receiving a control signal indicative of the total power command;

compensating the total power command with the line-side converter power at an input of a power regulator of the double-fed wind turbine generator to produce a stator power control command;

using the stator power control command to regulate stator power of the double-fed wind turbine generator.

6. The method of claim 2, wherein the internal impedance value comprises an internal virtual impedance value at a node internal of the double-fed wind turbine generator.

7. The method of claim 6, further comprising determining a voltage deviation across the internal virtual impedance value of the double-fed wind turbine generator using a current feedback signal.

8. The method of claim 7, wherein using the control command to regulate at least one of the power or the current in the stator of the double-fed wind-turbine generator further comprises:

determining a difference between the voltage deviation from the internal voltage command to obtain a magnetizing voltage command;

calculating a feedforward component using the magnetizing voltage command;

determining a magnetizing current command using the feedforward component and a trim component; and calculating one or more rotor current commands for double-fed wind turbine generator using the magnetizing current command and at least one current feedback signal.

9. A system for providing grid-forming control of an double-fed wind turbine generator connected to an electrical grid, the double-fed wind turbine generator having a line-side converter coupled a rotor-side converter via a DC link, the system comprising:

a controller comprising at least one processor, the at least one processor configured to perform a plurality of operations, the plurality of operations comprising:

receiving at least one control signal associated with a desired total power output or a total current output of the double-fed wind turbine generator, wherein the at least one control signal associated with the desired total power output or the total current output of the double-fed wind turbine generator comprises at least one of a phase angle or a total power command;

determining a contribution of at least one of power or current from the line-side converter to the desired total power output or to the total current output of the double-fed wind turbine generator, respectively;

determining a control command for a stator of the double-fed wind turbine generator based on the contribution of at least one of the power or the current from the line-side converter and the at least one control signal, wherein determining the control command for the stator further comprises regulating a total power output using the total power command to produce an angle command and compensating the angle command to produce the control command for the stator; and using the control command to regulate at least one of power or current in the stator of the double-fed wind-turbine generator.

10. The system of claim 9, wherein compensating the angle command to produce the control command for the stator of the double-fed wind turbine generator further comprises:

estimating a line-side converter power as a function of total power command and a slip of the double-fed wind turbine generator;

estimating a compensation angle as a function of the line-side converter power and an internal impedance value of the double-fed wind turbine generator; and compensating the angle command to produce the control command for the stator of the double-fed wind turbine generator using the compensation angle.

11. The system of claim 10, wherein estimating the compensation angle as a function of the line-side converter power and the internal impedance value of the double-fed wind turbine generator further comprises:

receiving an electrical frequency and a rotor speed of the double-fed wind turbine generator;

determining the slip of the double-fed wind turbine generator as a function of the electrical frequency and the rotor speed;

determining a ratio of the stator power to total power of the double-fed wind turbine generator using the slip; and calculating the compensation angle as a function of the ratio, the internal impedance value, and the total power command.

12. The system of claim 11, wherein the internal impedance value of the double-fed wind turbine generator comprises the internal virtual impedance value and an internal physical impedance value.

13. The system of claim 11, wherein determining the control command for the stator of the double-fed wind turbine generator based on the contribution of at least one of the power or the current from the line-side converter and the at least one control signal further comprises:

receiving a control signal indicative of the total power command;

compensating the total power command with the line-side converter power at an input of a power regulator of the double-fed wind turbine generator to produce a stator power control command;

using the stator power control command to regulate the stator power of the double-fed wind turbine generator.

14. The system of claim 10, wherein the internal impedance value comprises an internal virtual impedance value at a node internal of the double-fed wind turbine generator.

15. The system of claim 14, further comprising determining a voltage deviation across the internal virtual impedance value of the double-fed wind turbine generator using a current feedback signal.

16. The system of claim 15, wherein using the control command to regulate at least one of the power or the current in the stator of the double-fed wind-turbine generator further comprises:
- determining a difference between a voltage deviation from the at least one virtual impedance value to obtain a magnetizing voltage command;
- calculating a feedforward component using the magnetizing voltage command;
- determining a magnetizing current command using the feedforward component and a trim component; and
- calculating one or more rotor current commands for double-fed wind turbine generator using the magnetizing current command and at least one current feedback signal.

* * * * *